United States Patent
Kim et al.

(10) Patent No.: US 12,433,853 B2
(45) Date of Patent: Oct. 7, 2025

(54) RATIONALLY DESIGNED LAWSONE DERIVATIVES AS ANTIMICROBIALS AGAINST MULTIDRUG-RESISTANT *Staphylococcus aureus*

(71) Applicant: KENT STATE UNIVERSITY, Kent, OH (US)

(72) Inventors: Min-Ho Kim, Hudson, OH (US); Songping D. Huang, Kent, OH (US); Ronghui Song, Pittsburgh, PA (US); Bing Yu, Chesterbrook, PA (US)

(73) Assignee: Kent State University, Kent, OH (US)

( * ) Notice: Subject to any disclaimer, the term of this patent is extended or adjusted under 35 U.S.C. 154(b) by 830 days.

(21) Appl. No.: 17/637,581

(22) PCT Filed: Aug. 26, 2020

(86) PCT No.: PCT/US2020/047943
§ 371 (c)(1),
(2) Date: Feb. 23, 2022

(87) PCT Pub. No.: WO2021/041506
PCT Pub. Date: Mar. 4, 2021

(65) Prior Publication Data
US 2022/0273586 A1    Sep. 1, 2022

Related U.S. Application Data

(60) Provisional application No. 62/891,620, filed on Aug. 26, 2019.

(51) Int. Cl.
| | |
|---|---|
| *A61K 31/122* | (2006.01) |
| *A61K 31/431* | (2006.01) |
| *A61K 31/496* | (2006.01) |
| *A61K 31/5383* | (2006.01) |
| *A61K 38/14* | (2006.01) |
| *A61P 31/04* | (2006.01) |
| *C07C 45/74* | (2006.01) |

(52) U.S. Cl.
CPC .......... *A61K 31/122* (2013.01); *A61K 31/431* (2013.01); *A61K 31/496* (2013.01); *A61K 31/5383* (2013.01); *A61K 38/14* (2013.01); *A61P 31/04* (2018.01); *C07C 45/74* (2013.01)

(58) Field of Classification Search
CPC .. A61K 31/381; A61K 31/122; A61K 31/496; A61K 31/431; A61P 31/04
See application file for complete search history.

(56) References Cited

U.S. PATENT DOCUMENTS

| | | | |
|---|---|---|---|
| 4,970,328 A | * | 11/1990 | Lindner ................. C07C 50/24 552/298 |
| 2007/0060506 A1 | | 3/2007 | Walsh et al. |
| 2010/0216852 A1 | | 8/2010 | Ausubel et al. |
| 2013/0102650 A1 | | 4/2013 | Boum, II et al. |

FOREIGN PATENT DOCUMENTS

| | | | | |
|---|---|---|---|---|
| EP | 0870500 A1 | * | 12/1996 | |
| WO | WO-2007041341 A2 | * | 4/2007 | ............. A61P 35/04 |
| WO | 2008066576 A2 | | 6/2008 | |
| WO | WO-2011124697 A1 | * | 10/2011 | ............. A61P 31/04 |
| WO | 2013036766 A1 | | 3/2013 | |

OTHER PUBLICATIONS

Newton (Clin. Infect Disease vol. 16 531-533. Published 1993) (Year: 1993).*
59725-57-4, 59304-95-9, STN-Register, Nov. 16, 1984, p. 1.
Second Review Opinion dated Oct. 17, 2023 for corresponding Chinese Application 202080059954.3.
Renli, Li et al., Homologous Effect of Medicine Structures, Relationship Between Structure and Effect of Medicine, China Medical Science and Technology Press, Jan. 31, 2004, pp. 211-212.
Official Action for Corresponding Chinese Application 202080059954.3 dated Apr. 23, 2023 with English translation.

* cited by examiner

*Primary Examiner* — George W Kosturko
(74) *Attorney, Agent, or Firm* — Hudak, Shunk & Farine Co. LPA

(57) ABSTRACT

Naphthoquinone derivatives of Lawsone have been found to be effective against *Staphylococcus aureus* and methicillin resistant *Staphylococcus aureus* (MRSA). Such compounds generally contain a substituent group at the 3-position of a specific naphthoquinone compound, i.e. 2-hydroxy-1,4-naphthoquinone. One of these derivatives referred to as compound 6c in the series exhibits potent antimicrobial activity that is comparable to that of the two commercial antibiotics ofloxacin and ciprofloxacin against the two strains of methicillin sensitive *Staphylococcus aureus* (MSSA; ATCC 29213 and ATCC 6538). In the case of two strains of MRSA (ATCC BAA-44 and ATCC BAA-1717) that have developed drug resistance to both ofloxacin and ciprofloxacin, the antimicrobial activity of 6c can almost rival that of vancomycin and daptomycin. Furthermore, 6c is also effective against vancomycin-intermediate and daptomycin non-susceptible strain of MRSA (ATCC 700699). Besides the efficacy, 6c has a much improved drug resistance profile in comparison with the conventional antibiotics.

8 Claims, 11 Drawing Sheets

TABLE 1

| Compound | MIC (µg/mL) | | | | | Molecular weight[e] (g/mol) |
| --- | --- | --- | --- | --- | --- | --- |
| | MSSA (ATCC 29213) | MSSA (ATCC 6538) | VISA (ATCC 700699) | MRSA (USA300, ATCC BAA-1717) | MRSA (ATCC BAA-44) | |
| Lawsone | 16 | 32 | 64 | 128 | 32 | 174.16 |
| 6a | 128 | >128 | 128 | >128 | >128 | 264.28 |
| 6b | 32 | 32 | 128 | 64 | 32 | 292.33 |
| 6c | 1.25~1.9 | 0.6 | 1.25~2.5 | 1.25~2.5 | 1.25~2.5 | 320.39 |
| 6d | >128 | >128 | >128 | >128 | >128 | 348.44 |
| 6e | >128 | >128 | >128 | >128 | >128 | 376.50 |
| Vancomycin | 0.5 | 1 | 4 | 1 | 1 | 1449.27 |
| Daptomycin | 0.5 | 1 | 4 | 1 | 1 | 1620.69 |
| Ofloxacin | 0.25 | 0.25 | 16 | 0.25 | 8 | 361.37 |
| Ciprofloxacin | 0.25 | 0.25 | 32 | 0.25 | 16 | 331.34 |

Figure 2

TABLE 2

| MICs against MRSA (ATCC BAA-44) | | | | FIC index |
| --- | --- | --- | --- | --- |
| Oxacillin only | Oxacillin with 6c[a] | 6c only | 6c with Oxacillin[b] | 0.31 |
| 64 µg/mL | 4 µg/mL | 2.5 µg/mL | 0.6 µg/mL | |

Figure 3

| Compound | MIC (µg/mL | | |
|---|---|---|---|
| | SA (29213) | SA (6538) | MDRSA (BAA-44) |
| Lawsone | 16 | 32 | 32 |
| 6a | 128 | >128 | >128 |
| 6b | 32 | 32 | 32 |
| 6c | 1.9 | 0.6 | 25 |
| 6d | >128 | >128 | >128 |
| 6e | >128 | >128 | >128 |
| Vancomycin | 0.5 | 1 | 1 |
| Ofloxacin | 0.25 | 0.25 | 8 |
| Ciprofloxacin | 0.25 | 0.25 | >128 |

Figure 12

RATIONALLY DESIGNED LAWSONE DERIVATIVES AS ANTIMICROBIALS AGAINST MULTIDRUG-RESISTANT *Staphylococcus aureus*

This invention was made with government support under Grant No. R01NR015674 awarded by the National Institutes of Health—NINR. The Government has certain rights in the invention

FIELD OF THE INVENTION

Naphthoquinone derivatives of Lawsone have been found to be effective against *Staphylococcus aureus* and methicillin-resistant *Staphylococcus aureus* (M RSA). Such compounds generally contain a substituent group at the 3-position of the naphthoquinone compound.

BACKGROUND OF THE INVENTION

*Staphylococcus aureus* (SA) is the leading cause of skin and soft tissue infections. These infections are often the major bacterial portal of entry into more serious and sometimes life-threatening organ and systemic infections such as pneumonia and bacteremia or sepsis. The emergence of methicillin-resistant *Staphylococcus aureus* (MRSA), the so-called superbugs that show resistance to multiple antibiotic drugs, has created a global healthcare crisis as more and more clinical antibiotics are losing their edge in fighting such deadly infections. The majority of the current commercial antibiotics are derived from soil-dwelling microorganisms. After over seven decades of extensive screening and searching, fewer and fewer numbers of novel antibiotics can be discovered these days. As a matter of fact, no new class of antibiotics has been found since the discovery of antibacterial lipopeptides in 1987, which explains why a recently discovered new antibiotic teixobactin from soil bacteria has generated so much excitement worldwide. Overall, this dire situation necessitates a paradigm shift in the development of novel antimicrobial drugs for treating infections caused by SA and MRSA.

SUMMARY OF THE INVENTION

This invention relates to a group of new antimicrobials with a high efficacy for SA and MRSA. Such antimicrobials are obtained through the rationally designed organic synthesis based on the structural platform of Lawsone (2-hydroxy-1,4-naphthoquinone). Lawsone is a plant-derived natural product extracted from the henna tree (*Lawsonia inermis*) and has been widely used in the traditional Chinese and Ayurvedic medicine as a mild antimicrobial and antifungal drug for treating a variety of ailments. Through the systematic variation of the substituent group at the 3-position of the Lawsone structure, we have obtained a specific derivative of Lawsone whose in vitro and in vivo antimicrobial activity for SA and MRSA is comparable to conventional antibiotics including vancomycin and daptomycin, or even better that these two antibiotics with respect to drug resistance profiles.

BRIEF DESCRIPTION OF THE DRAWINGS

FIG. 2 shows Table 1, a chart showing the minimum inhibitory concentration (MIC) values for Lawsone derivatives in comparison with conventional antibiotics against different strains of *Staphylococcus aureus*, MSSA: methicillin-sensitive *S. aureus*, VISA: vancomycin-intermediate *S. aureus*. The MICs were determined by the broth microdilution method by following Clinical and Laboratory Standards Institute (CLSI) guidelines FIG. 3 shows Table 2, a chart showing the determination of MIC values and fractional inhibitory concentration (FIC) index of compound 6c and antibiotic oxacillin against MRSA by checkerboard assay. MIC of oxacillin in the presence of 0.6 μg/mL of 6c. [b]MIC of 6c in the presence of 4 μg/mL of oxacillin. The MICs were determined by the broth microdilution method by following Clinical and Laboratory Standards Institute (CLSI) guidelines.

FIG. 12 is a table showing the MIC values for Lawsone derivatives against different strains of *Staphylococcus aureus*.

The data set forth in the various charts, tables, and figures were obtained by using standard and elementary procedures well known to the those skilled in the art and also set forth in the literature. Such data generally relates to sensitivity of an individual having a wound, etc., utilizing the antibiotic of the present invention.

DETAILED DESCRIPTION OF THE INVENTION

Figure 1:
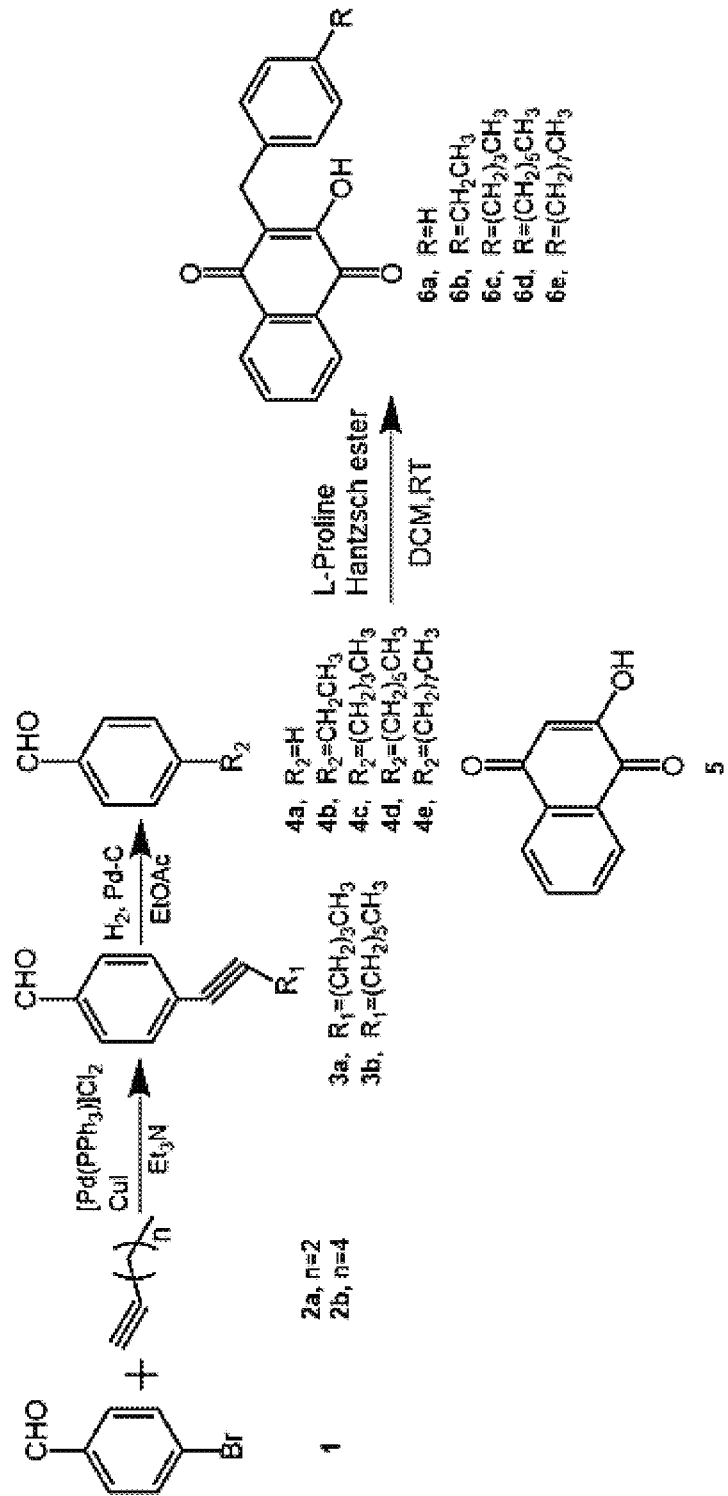
FIG. 1 shows Scheme 1, a synthetic scheme for the preparation of the Lawsone derivatives.

The synthetic procedure for preparing the series of Lawsone derivatives is summarized in FIG. 1, which shows Scheme 1. Spectroscopic characterization and X-ray structural determination unequivocally confirmed the identities of all the five new compositions of matter, that is compounds denoted as 6a through 6e. The results of in vitro bioassays obtained by evaluating the MIC values indicate that 6c exhibits antimicrobial activity that is comparable to that of the two commercial antibiotics ofloxacin and ciprofloxacin against the two strains of MSSA (i.e. ATCC 29213 and ATCC 6538) as shown in FIG. 2, Table 1. In the case of the MRSA (ATCC BAA-44 and ATCC BAA-1717; MIC=1.25~2.5 µg/mL) that have developed drug resistance to both ofloxacin and ciprofloxacin, the antimicrobial activity of 6c can rival that of vancomycin and daptomycin (MIC=~1 µg/mL), which are the last resort antibiotics against MRSA (FIG. 2, Table 1). Furthermore, 6c was also effective against vancomycin-intermediate and daptomycin non-susceptible strain of MRSA (ATCC 700699; MIC=1.25~2.5 µg/mL).

Figure 4:
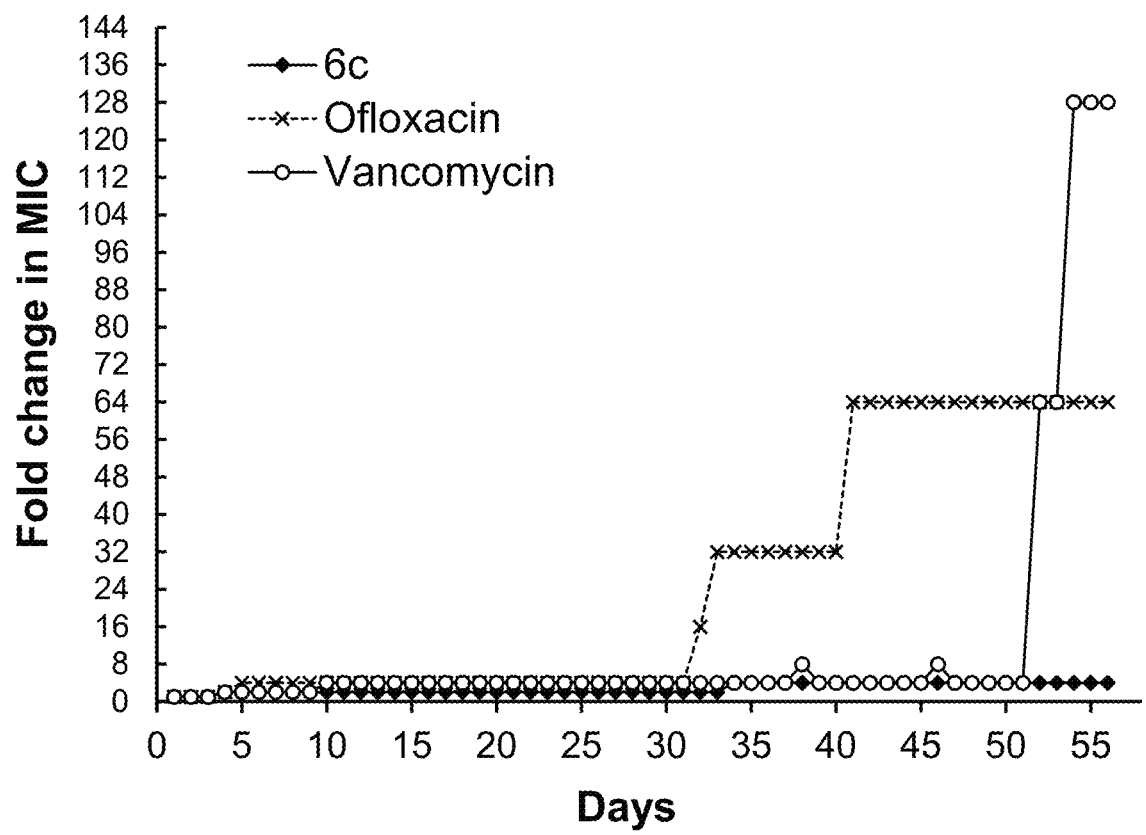
FIG. 4 is a chart showing the drug resistance development of 6c in comparison with vancomycin and ofloxacin in MRSA (ATCC BAA-44)
Figure 5:
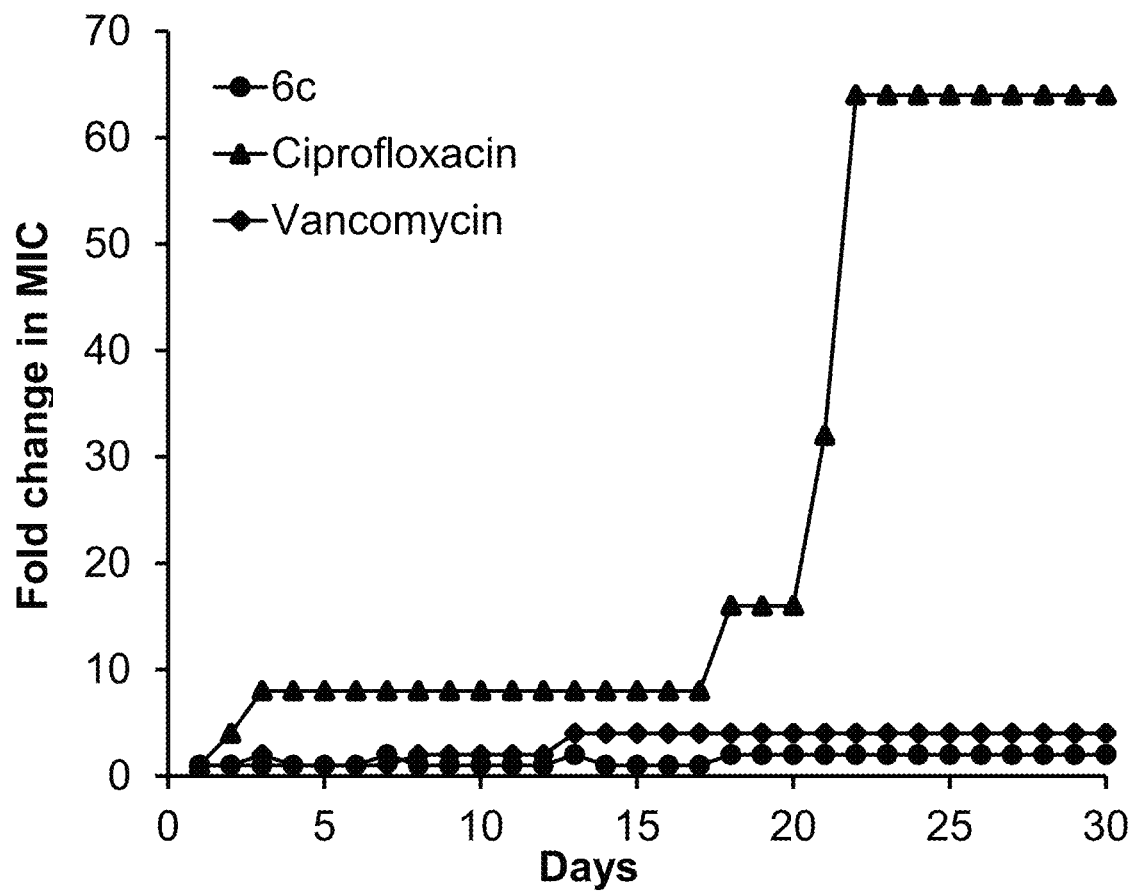
FIG. 5 is a chart showing the drug resistance development of 6c in comparison with vancomycin and ciprofloxacin in MSSA (ATCC SA 29213)
Figure 6:
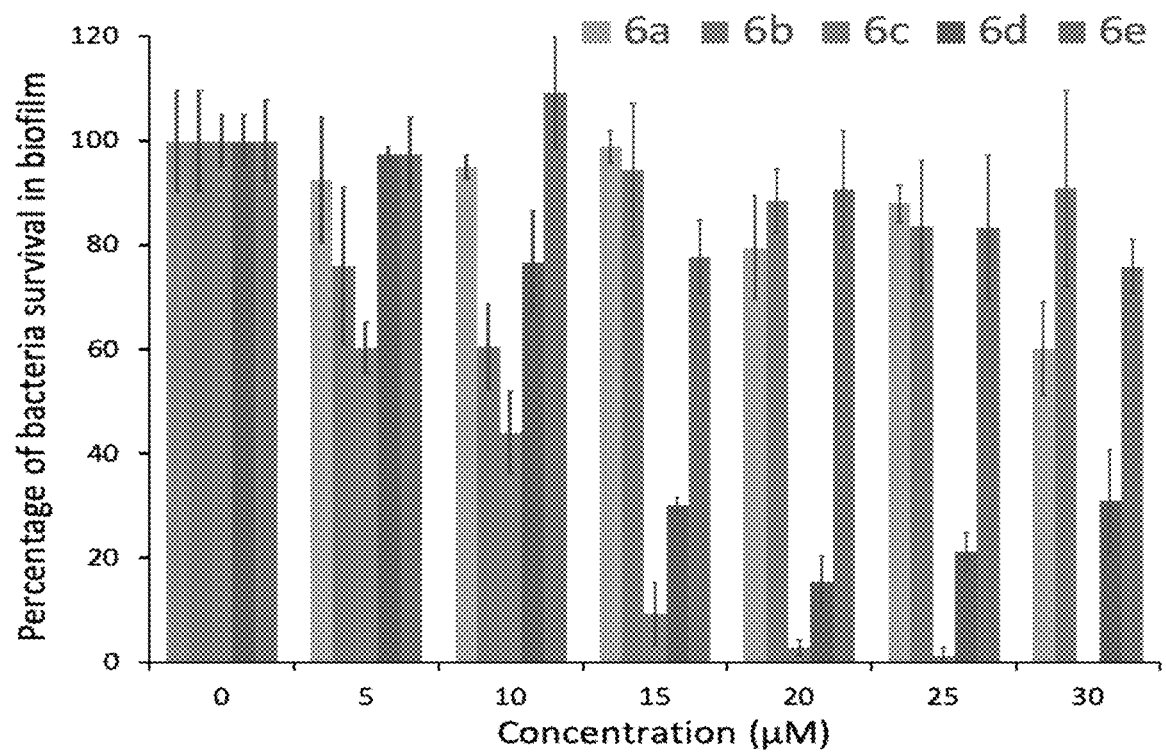
FIG. 6 is a chart showing the effect of 6c on the inhibition of biofilm formed by MRSA (ATCC BAA-44). Percentage of viable bacteria in the biofilm formed by MRSA in response to the treatment of Lawsone-derivatives (6a, 6b, 6c, 6d, and 6e) at varying concentrations (0-30 μM) (mean±s·d, n=3 independent experiments)

Typical clinical antibiotics can readily produce genetic mutants when used to treat the same bacterial over and over again, which is the major cause of antibiotic drug resistance in many pathogenic bacteria these days and of emergence of superbugs. To test if 6c can develop drug resistance in either MSSA (ATCC 29213) or MRSA (ATCC BAA-44), we performed sequential passaging studies with 6c. Briefly, the MIC values for $S.$ $aureus$ strains to be tested were determined first. Then, cells grown in the initial MIC dose of the compound or antibiotics from the previous passage were once again harvested after 24-h incubation period and assayed for a new MIC. The process was repeated for 56 passages against MRSA (ATCC BAA-44). The initial MIC values of ofloxacin, vancomycin and 6c against MRSA were 8.0, 1.0 and 1.25 µg/mL, respectively (FIG. 4). The MIC of ofloxacin increased by 4-fold after 5 passages, by 32-fold at 35 passages, and 64-fold at 56 passages. The MIC of vancomycin was modestly increased by 4-fold by 51 passages and reached an abrupt increase of 128-fold at 56 passages by displaying a mutant phenotype of MRSA resistant to vancomycin (MRSA$^{vanR}$). In contrast, the MIC of 6c was largely unchanged up to 33 passages and then modestly increased by only 4-fold, which was maintained by 56 passages, the end of measurements. The improved drug resistance profile of 6c was also observed for MSSA (ATCC 29213 strain, (FIG. 5). We next examined whether 6c could still retain antimicrobial activity against mutant strains of MRSA developed with repeated exposures of ofloxacin and vancomycin. The MICs of 6c against mutant MRSA that had become resistant to ofloxacin (MRSA$^{oflR}$) or vancomycin (MRSA$^{vanR}$) at the day 56 passage were not significantly altered from initial value of MIC for wild-type MRSA, which measured to be unchanged for MRSA$^{oflR}$ (1.25 µg/mL) and 5 µg/mL for MRSA$^{vanR}$. This suggests that 6c did not generate cross-resistance against mutant $S.$ $aureus.$ By observing the antibacterial efficacy of 6c against planktonic phase of MRSA, we next examined whether 6c could be effective against biofilm phase of MRSA. For this, the biofilm inhibition assay was performed using the established procedure. Specifically, an overnight culture of MRSA (ATCC BAA-44) was diluted to a final cell concentration of 1×10$^6$ CFU/mL and transferred (100 µL) to a 96-well plate containing 6c at varying concentrations ranging from 0 to 30 µM. The bacterial cells were incubated with stationary phase for 24 h at 37° C. to form biofilms. After incubation, the biofilm was gently washed to keep the integrity of the biofilms intact and resuspended with PBS. For the quantification of biofilm mass, the solutions in the plate with biofilm were replaced with a 100 µL solution containing 0.5% of crystal violet and incubated for 30 min at room temperature in the dark. After incubation, the biofilms were added with PBS and solubilized by adding a 150 µL acetic acid. The absorbance of the biofilm was measured at 595 nm using a microplate reader and the results were expressed as percentage changes with respect to the control (without compounds). For the quantification of the number of viable bacteria in the biofilm, the biofilms were gently destroyed and plated on TSA after serial dilutions of each suspension. The number of viable bacteria in the sample was obtained using agar plate counting method as described above and results were expressed as percentage changes with respect to the control. Our results show that, in addition to the potency of 6c against planktonic phase of MRSA, 6c could significantly suppress the formation of biofilm formed by MRSA by 40% at a dose of 1×MIC (5 µM or 1.5 µg/mL) and by 90% at a dose of 3×MIC (15 µM or 4.5 µg/mL) (FIG. 6).

Since the mode of antimicrobial action of 6c does not overlap with those of traditional antibiotics, we examined whether the 6c would complement traditional antibiotics for the use as a combination therapy against MRSA by using a checkerboard assay. The checkerboard assay was performed in a 96-well plate using the established method. Specifically, the antibiotic oxacillin was 2-fold serially diluted along the row-axis and 6c was 2-fold serially diluted along the column-axis to create a matrix in which each well consists of a combination of both at different concentrations. Each well was inoculated with MRSA (ATCC BAA-44) to yield approximately 5×10$^5$ CFU/mL in a 100-µL final volume, incubated for 20 h at 37° C. and examined for visibility to determine the MIC. Dividing the MIC of 6c in the presence of antibiotic by the MIC of 6c alone was used to calculate the fractional inhibitory concentration (FIC) of 6c. Similarly, dividing the MIC of antibiotic in the presence of 6c by the MIC of the antibiotic alone was used to calculate the fractional inhibitory concentration (FIC) of the antibiotic. The FIC index was calculated by the summation of both FIC values. The FIC index was interpreted as synergistic, additive, or antagonistic for values of x≤0.5, 0.5<x<4, or ≥4, respectively. The results showed the FIC is 0.31 for 6c, suggesting the synergistic effect of 6c (FIG. 3, Table 2).

Figure 7:
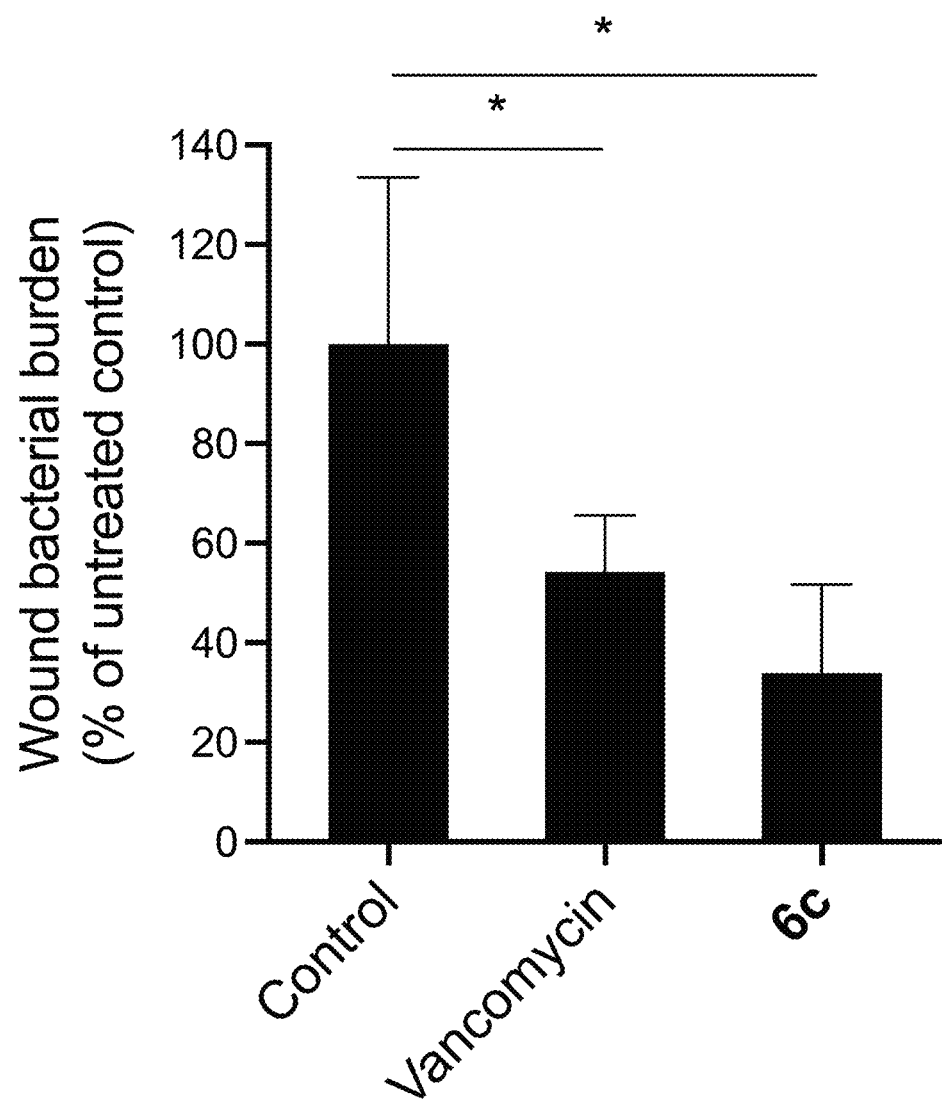
FIG. 7 is a chart showing the effect of the treatment of 6c or vancomycin (via topical treatment, single dose at 80 μg per wound) on the bacterial burden in wounds of mice (C57BL/6 mice, male, 8-12 weeks old) infected by MRSA at day 2 post-wounding (mean±s·d, n=3 mice per group). The CFU counts from homogenized tissue collected from each mouse was run in duplicates. *: $p<0.05$ vs control.
Figure 8:
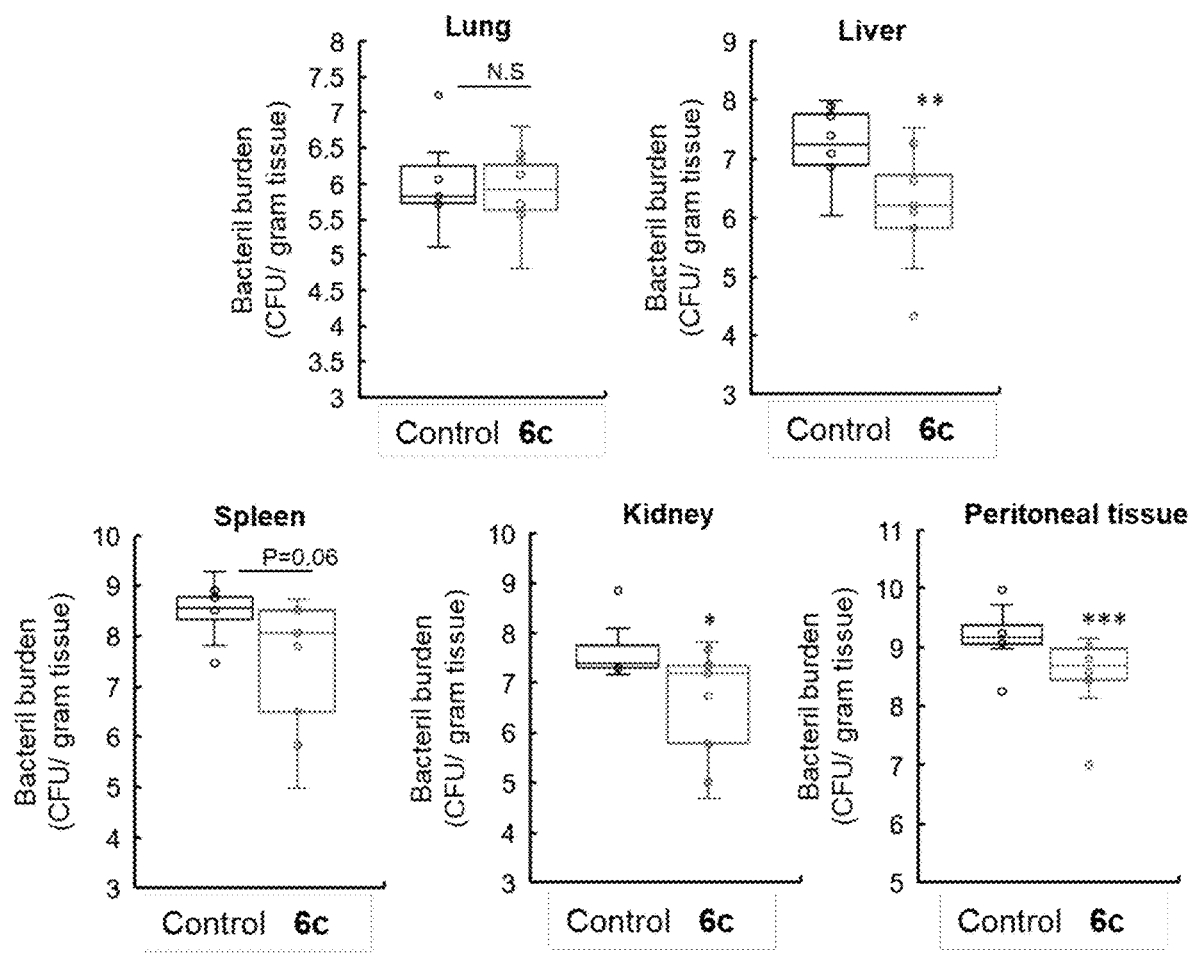
FIG. 8 is a chart showing the effect of the treatment of 6c (via i.p injection, single dose at 15 mg/kg at day 2 post-infection) on the bacterial burden in lung (b), spleen (c), kidney (d), liver (e), and peritoneal (f) tissues of mice (C57BL/6 mice, male, 8-12 weeks old) infected by MRSA (mean±s·d, n=8 mice per group). The CFU counts from homogenized tissue collected from each mouse was run in duplicates. *: $p<0.05$, : $p<0.01$, and *: $p<0.001$.
Figure 9:
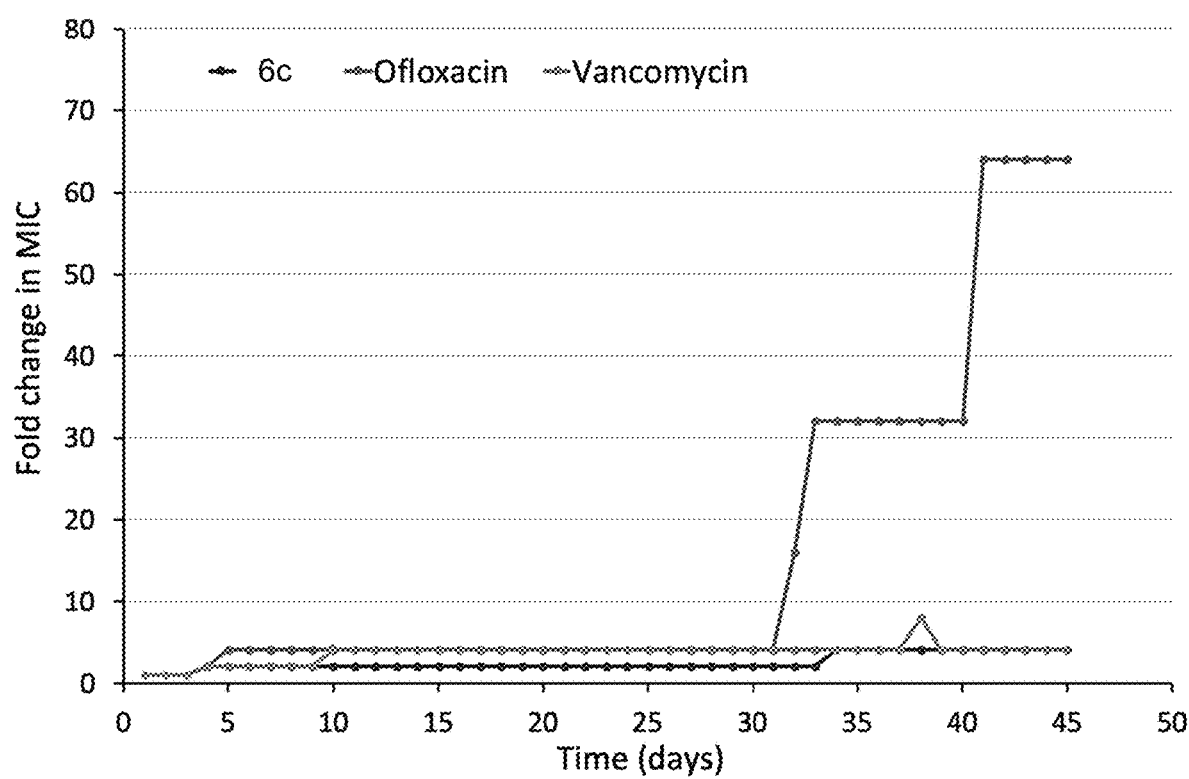
FIG. 9 is similar to FIG. 4 and shows the drug resistance development of 6c in comparison with vancomycin and ofloxacin in MDRSA BAA-44.
Figure 10:
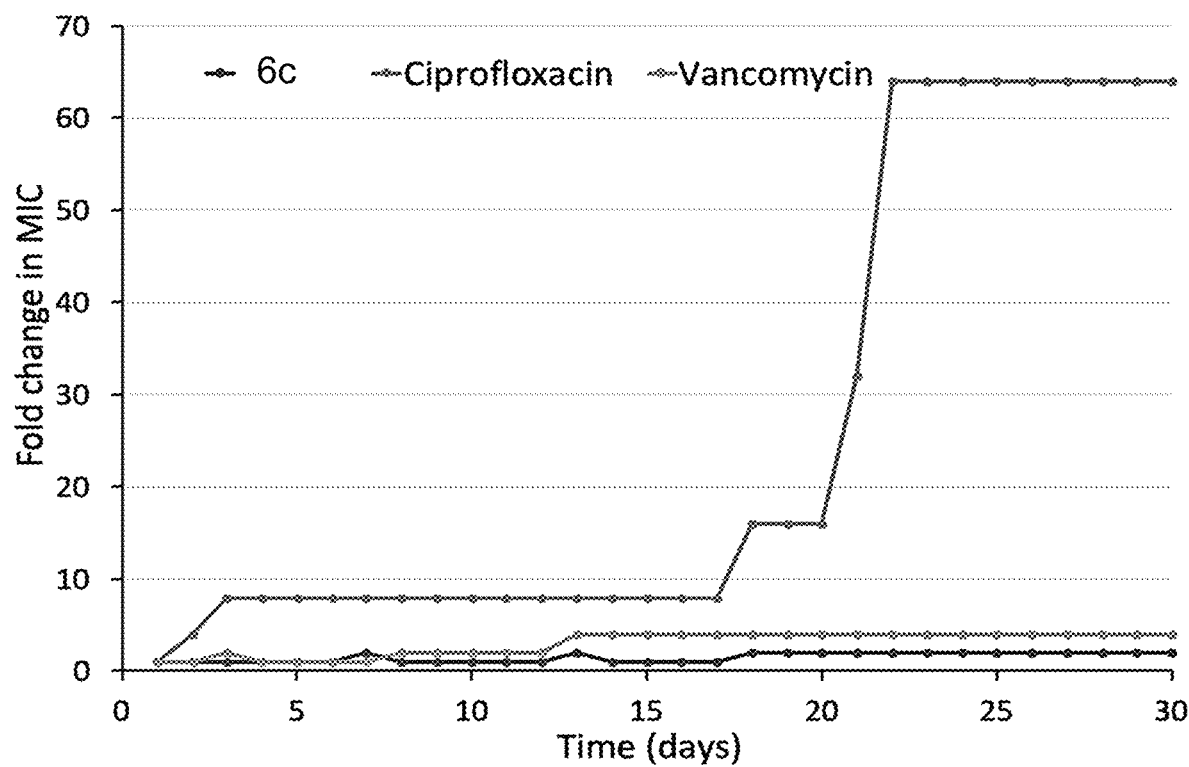
FIG. 10 is similar to FIG. 5 and shows the drug resistance development of 6c in comparison to vancomycin and ciprofloxacin in SA 29213.
Figure 11:
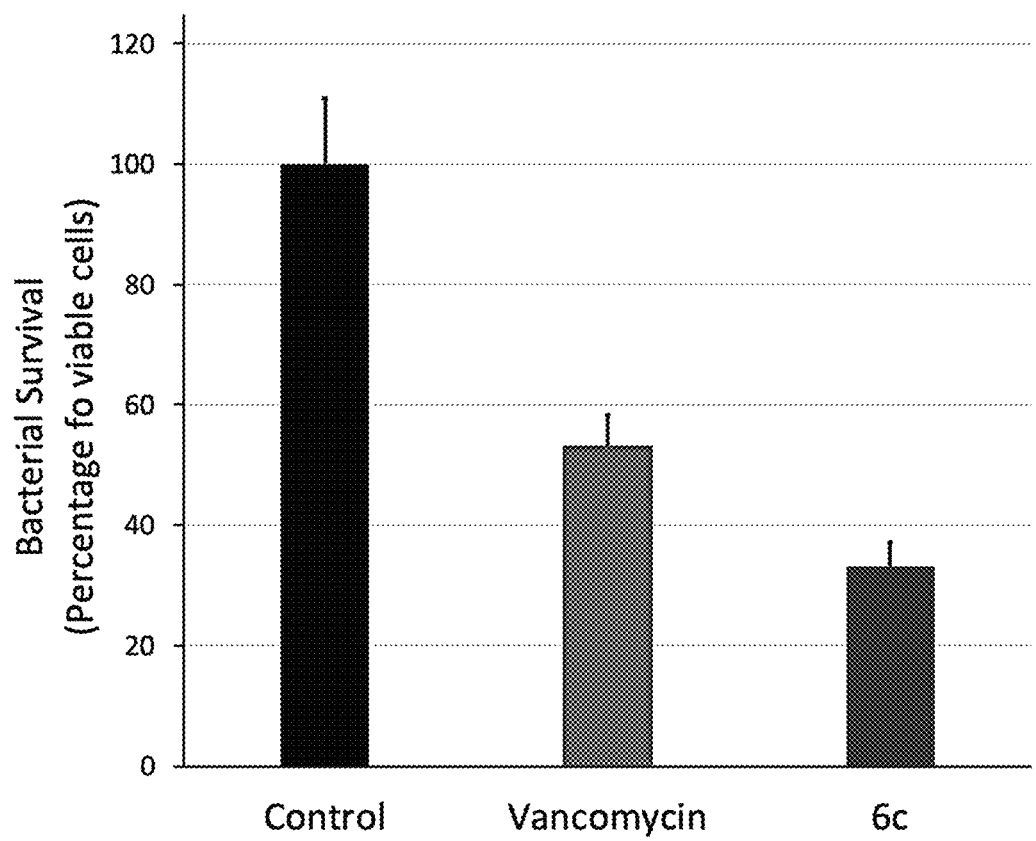
FIG. 11 is similar to FIG. 7 and is a chart showing the bacterial survival percentage derived from colony counting method after topical treatment of 6c and vancomycin on the bacterial burden in wounds of mice infected by MRSA at day 2 post-wounding with 4 mg/kg.

To validate the in vivo antibacterial efficacy, we conducted the studies of treating the infections of local wound infection as well as non-lethal systemic infection induced by MRSA. For local infection, a full-thickness, circular wound was generated on the dorsal surface of each mouse (C57BL/6) using a 6-mm sterile biopsy punch after the mouse was anesthetized, followed by inoculating with 1×10$^6$ CFU MRSA (ATCC BAA-44) in the wounded skin at day 0 and then a defined amount of 6c or vancomycin (80 µg in 40 µL sterile saline per wound) was topically applied once to the wounds of mice at day 1 post-infection. The CFU number of viable bacteria in the wound was quantified at day 2 post-infection. As compared with the control group, the single dose treatment of 6c significantly reduced MRSA numbers in the wound by 60%, which was comparable to that of vancomycin (~50% reduction in bacterial burden in wounds) (FIG. 7). For validation of 6c for systemic infection, MRSA (1×10$^8$ CFU in 100 µL PBS) were intraperitoneally injected (i.p) to C57BL/6 mice and the mice were treated with a single dose of 6c (15 mg/kg, i.p) at day 1 post-infection. The CFU number of viable bacteria was counted at day 2 post-infection from major organs including lung, kidney, spleen, liver, and peritoneal tissues. The mice treated with 6c exhibited significantly reduced bacterial burdens in kidney, liver, and peritoneal tissues, compared to vehicle control group (p<0.05) (FIG. 8). Collectively, our results validate that compound 6c is therapeutically effective in eradicating MRSA in both local and systemic infections.

EXAMPLES

Synthetic Procedure and Characterization of Naphthoquinone Derivatives of Lawsone Compounds Preparation of one or more naphthoquinone derivatives of Lawsone that have the formulation set forth in the right-hand portion of FIG. 1, which shows Scheme 1 wherein R independently can be as shown but generally made as follows.

1. Synthesis of Intermediates 3a and 3b

Copper(I) iodide (0.042 g, 0.220 mol) was added to a solution containing 4-bromobenzaldehyde (1.85 g, 10.0 mmol), bis(triphenylphosphine)palladium(II) dichloride (0.077 g, 0.110 mmol) and 1-hexyne (0.986 g, 12.0 mmol) or 1-octyne (1.32 g, 12.0 mmol) in the solvent triethylamine $Et_3N$ (20 mL). The concentration range of copper(I) iodide in the solvent triethylamine $Et_3N$ is from about $1.1 \times 10^{-3}$ mol/mL to about $1.1 \times 10^{-1}$ mol/mL$^-$, the desired concentration range is from about $5.5 \times 10^{-4}$ mol/mL to about $5.5 \times 10^{-2}$ mol/mL, and the preferred range is $2.2510^{-4}$ mol/mL to about $2.2510^{-2}$ mol/mL. The concentration range of 4-bromobenzaldehyde in the solvent triethylamine $Et_3N$ is from about $5.0 \times 10^{-4}$ mmol/mL to about 5.0 mmol/mL, the desired concentration range is $2.5 \times 10^{-3}$ mmol/mL to about 2.5 mmol/mL, and the preferred range is from about $1.0 \times 10^{-2}$ mmol/mL to about 1.0 mmol/mL. The concentration range of bis(triphenylphosphine)palladium(II) dichloride in the solvent triethylamine $Et_3N$ is from about $5.5 \times 10^{-5}$ mmol/mL to about $5.5 \times 10^{-1}$ mmol/mL, the desired concentration range is from about $2.25 \times 10^{-4}$ mmol/mL to about $2.25 \times 10^{-2}$ mmol/mL, and the preferred range is from about $2.5 \times 10^{-3}$ mmol/mL to about $2.5 \times 10^{-1}$ mmol/mL. The concentration range of 1-hexyne in the solvent triethylamine $Et_3N$ is from about $6.0 \times 10^{-3}$ mmol/mL to about 60 mmol/mL, the desired concentration range is from about $6.0 \times 10^{-2}$ mmol/mL to about 6.0 mmol/mL, and the preferred range is from about $3.0 \times 10^{-2}$ mmol/mL to about 3.0 mmol/mL. The concentration range of 1-octyne in the solvent triethylamine $Et_3N$ is from about $6.0 \times 10^{-3}$ mmol/mL to about 60 mmol/mL, the desired concentration range is from about $6.0 \times 10^{-2}$ mmol/mL to about 6.0 mmol/mL, and the preferred range is from about $3.0 \times 10^{-2}$ mmol/mL to about 3.0 mmol/mLo. This solution was vigorously stirred overnight at 50° C. under the protection of nitrogen gas ($N_2$). The temperature range is 25° C. to 100° C., the preferable temperature range is 35° C. to 80° C., and the optimal (best) range is 45° C. to 65° C. The reaction mixture was then cooled to room temperature and filtered through a filter with Celite to remove any insoluble materials. The filtrate was washed with 20-mL brine each time for three times and dried over anhydrous $MgSO_4$. The solvent was removed by rotary evaporator, and the resulting products were purified by flash column chromatography filled with silica gel using hexane as eluent to afford the final products that are used directly in next reaction.

1.1 Characterization Data of Intermediates 3a and 3b 4-(1-Hexyn-1-yl)benzaldehyde (3a): yellow oil; yield 1.62 g (87%)/0). $^1$H NMR results (400 MHz, CDCl3): δ(ppm)=0.90 (t, J=7.2 Hz, 3H, —$CH_3$), 1.43-1.67 (m, 4H, —$CH_2$—), 2.44 (t, J=6.9 Hz, 2H, —C≡C—$CH_2$—), 7.51 (d, J=8.3 Hz, 2H, Ar—H), 7.78 (d, J=8.3 Hz, 2H, Ar—H), 9.97 (s, 1H, —CHO).

4-(1-Octyn-1-yl)benzaldehyde (3b): yellow oil; yield 1.79 g (83%) $^1$H NMR (400 MHz, CDCl$_3$) δ(ppm)=0.90 (t, J=7.1 Hz, 3H, —$CH_3$), 1.28-1.64 (m, 8H, —$CH_2$—), 2.44 (t, J=7.1 Hz, 2H, —C≡C—$CH_2$—), 7.53 (d, J=8.3 Hz, 2H, Ar—H), 7.80 (d, J=8.3 Hz, 2H, Ar—H), 9.99 (s, 1H, —CHO).

2. Synthesis of Intermediates 4d and 4e

Intermediate 3a (1.62 g, 8.70 mmol) dissolved in ethyl acetate (20 mL) was bubbled with $H_2$ gas using a syringe needle for 5 minutes. The concentration range of Intermediate 3a in the solvent ethyl acetate is from about $4.4 \times 10^{-3}$ mmol/mL to about 44 mmol/mL, the desired concentration range is from about $4.4 \times 10^{-2}$ mmol/mL to about 4.4 mmol/mL, and the preferred range is from about $2.2 \times 10^{-2}$ mmol/mL to about 2.2 mmol/mL. Palladium/activated carbon (Pd 10%) (0.080 g) was added into this solution. The amount of palladium/activated carbon added to the above solution is from about $8.0 \times 10^{-4}$ g to about 8.0 g, the desired amount range is from about $8.0 \times 10^{-3}$ mmol/mL to about 0.8 g, and the preferred range is from about $4.0 \times 10^{-2}$ g to about 0.4 g. The mixture was stirred for 6 h under the protection of hydrogen gas ($H_2$), followed by passing the solution through a filter with Celite, and washing the solid with 100-mL hexane each time twice. The stirring time range is from about 1 h to 60 h, the desired stirring time range is from about 3 h to about 30 h, and the preferred range is from about 4 h to about 10 h. The solvent in the filtrate was removed by rotary evaporator, and the resulting dark yellow oil was purified by silica gel flash column chromatography with hexane/ethyl acetate (20:1 v/v) as eluent to afford the final product (4d). The product was used in the next reaction without further purification. Intermediate 4e was synthesized use a similar procedure except intermediate 3b was used in the place of 3a.

2.1 Characterization Data of Intermediates 4d and 4e

4-Hexylbenzaldehyde (4d): yellow oil; yield 1.36 g (82%). $^1$H NMR (400 MHz, CDCl$_3$) δ(ppm)=0.87 (t, J=7.5 Hz, 3H, —$CH_3$), 1.31 (br, 6H), 1.63-1.57 (m, 2H), 2.68 (t, J=7.5, 2H, Ar—$CH_2$), 7.34 (d, J=7.5 Hz, 2H) 7.80 (d, J=7.5 Hz, 2H), 9.97 (s, 1H, —CHO), 4-Octylbenzaldehyde (4e): yellow oil; yield 1.39 g (76%). $^1$H NMR (400 MHz, CDCl$_3$) δ(ppm)=0.88 (t, J=7.1 Hz, 3H, —$CH_3$), 1.26-1.32 (m, 10H, —$CH_2$—), 1.61-1.67 (m, 2H, —$CH_2$—), 2.69 (t, J=7.1 Hz, 2H, Ar—CH2-), 7.34 (d, J=7.8 Hz, 2H, Ar—H), 7.80 (d, J=7.8 Hz, 2H, Ar—H), 9.97 (s, 1H, —CHO).

3. Synthesis of Compounds 6a-6e

L-proline (1.0 mmol) was added to a dichloromethane solution (50 mL) containing the corresponding aldehydes from 4a to 4e (10 mmol), intermediate 5, i.e. 2-hydroxy-1,4-naphthoquinone (5.0 mmol) and Hantzsch ester (6.0 mmol). The range of molar ratio of L-proline vs. the corresponding aldehydes from 4a-4e vs. 2-hydroxy-1,4-naphthoquinone vs. Hantzsch ester in the solvent dichloromethane is from about 0.06:0.05:1 to about 1:50:60:100 (: signifies the ratio between the different reagents), the desired molar ratio range is from about 0.03:0.25:0.5:1 to about 1:25:30:50, and the preferred range is from about 0.0015:0.0.0125:0.25:1 to about 1:12.5:15:25. This mixture was vigorously stirred at room temperature for 24 hours. The stirring time range is from about 1 h to about 72 h, the desirable stirring time range is from about 3 h to about 48 h, and the preferred range is from about 12 h to about 36 h. The temperature range is from about 5° C. to about 100° C., the desired temperature range is from about 10° C. to about 80° C., and the preferred range is from about 15° C. to about 55° C. The resulting solution was passed through a filter with Celite. The Celite was thoroughly washed with ethyl acetate 200 mL each time for three times. The filtrate was concentrated by using rotary evaporator. The final pure product was purified by flash column chromatography filled with silica gel using hexane and ethyl acetate as eluents.

Various tests such as set forth in FIG. 2, Table 1 reveal that compound 6c is preferred since it gave synergistic results.

3.1 Characterization Data of Compounds 6a-6e

2-Benzyl-3-hydroxy-[1,4]naphthoquinone (6a): yellow solid; yield: 74%; $^1$H NMR (400 MHz, CDCl$_3$) δ(ppm) =8.13 (1H, d, J=7.5 Hz), 8.07 (1H, d, J=7.5 Hz), 7.75 (1H, dt, J=7.5, 1.0 Hz), 7.68 (1H, dt, J=7.5, 1.0 Hz), 7.42 (2H, d, J=7.0 Hz), 7.28 (2H, t, J=7.5 Hz), 7.20 (1H, t, J=7.5 Hz), 3.97 (2H, s); $^{13}$C NMR (CDCl$_3$, 100 MHz) δ 184.4 (C, C=O), 181.7 (C, C=O), 153.0 (C), 138.9 (C), 135.0 (CH), 133.0 (CH), 132.8 (C), 129.4 (C), 129.2 (2×CH), 128.4 (2×CH), 126.9 (CH), 126.3 (CH), 126.1 (CH), 123.0 (C), 29.1 (CH$_2$)

2-[(4-Ethylphenyl)methyl]-3-hydroxy-[1,4]naphthoquinone (6b): yellow solid; yield: 66%; $^1$H NMR (400 MHz, CDCl$_3$) δ(ppm)=8.11 (dd, J=7.7, 1.3 Hz, 1H), 8.06 (dd, J=7.6, 1.1 Hz, 1H), 7.74 (td, J=7.6, 1.4 Hz, 1H), 7.66 (td, J=7.5, 1.3 Hz, 1H), 7.40 (s, 1H), 7.31 (d, J=8.1 Hz, 2H), 7.09 (d, J=8.2 Hz, 2H), 3.91 (s, 2H), 2.58 (q, J=7.6 Hz, 2H), 1.19 (t, J=7.6 Hz, 3H); $^{13}$C NMR (CDCl$_3$, 100 MHz) δ 184.4 (C, C=O), 181.7 (C, C=O), 152.9 (C), 142.3 (C), 136.1 (CH), 135.0 (CH), 132.9 (C), 129.4 (C), 129.1 (2×CH), 127.9 (2×CH), 126.9 (CH), 126.1 (CH), 123.3 (C), 28.7 (CH$_2$), 28.4 (CH$_2$), 15.5 (CH$_3$).

2-[(4-butylphenyl)methyl]-3-hydroxy-[1,4]naphthoquinone (6c): yellow solid; yield: 32%; $^1$H NMR (400 MHz, CDCl$_3$) δ(ppm)=8.12 (dd, J=7.7, 0.9 Hz, 1H), 8.06 (dd, J=7.6, 1.0 Hz, 1H), 7.74 (td, J=7.6, 1.4 Hz, 1H), 7.67 (td, J=7.5, 1.4 Hz, 1H), 7.39 (s, 1H), 7.30 (d, J=8.1 Hz, 1H), 7.07 (d, J=8.1 Hz, 2H), 3.91 (s, 2H), 2.59-2.50 (m, 2H), 1.62-1.45 (m, 2H), 1.32 (dq, J=14.6, 7.3 Hz, 2H), 0.89 (t, J=7.3 Hz, 2H); $^{13}$C NMR (CDCl$_3$, 100 MHz) δ 184.3 (C, C=O), 181.6 (C, C=O), 152.9 (C), 140.9 (C), 136.0 (CH), 135.0 (CH), 132.9 (C), 132.8 (C), 129.4 (2×CH), 129.0 (2×CH), 128.5 (CH), 126.9 (CH), 126.1 (CH), 123.3 (C), 35.2 (CH$_2$), 33.6 (CH$_2$), 28.7 (CH$_2$), 22.4 (CH$_2$), 13.9 (CH$_3$).

2-[(4-hexylphenyl)methyl]-3-hydroxy-[1,4]naphthoquinone (6d): yellow solid; yield: 35%; $^1$H NMR (400 MHz, CDCl$_3$) δ(ppm)=8.11 (dd, J=7.7, 0.9 Hz, 1H), 8.06 (dd, J=7.6, 1.0 Hz, 1H), 7.74 (td, J=7.6, 1.4 Hz, 1H), 7.66 (td, J=7.5, 1.4 Hz, 1H), 7.39 (s, 1H), 7.29 (d, J=8.1 Hz, 2H), 7.07 (d, J=8.1 Hz, 2H), 3.91 (s, 3H), 2.68-2.37 (m, 3H), 1.55 (p, J=7.6 Hz, 2H), 1.34-1.22 (m, 6H), 0.86 (t, J=6.5 Hz, 3H); $^{13}$C NMR (CDCl$_3$, 100 MHz) δ 184.4 (C, C=O), 181.7 (C, C=O), 152.9 (C), 141.0 (C), 136.0 (CH), 135.0 (CH), 132.9 (C), 129.4 (C), 129.0 (2×CH), 128.5 (2×CH), 126.9 (CH), 126.1 (CH), 123.3 (C), 29.1 (CH$_2$), 35.6 (CH$_2$), 31.7 (CH$_2$), 31.5 (CH$_2$), 29.1 (CH$_2$), 28.7 (CH$_2$), 22.6 (CH$_2$), 14.1 (CH$_3$).

2-[(4-octylpheny)methyl]-3-hydroxy-[1,4]naphthoquinone (6e): yellow solid; yield: 35%; $^1$H NMR (400 MHz, CDCl$_3$) δ(ppm)=8.11 (ddd, J=7.7, 1.4, 0.5 Hz, 1H), 8.05 (ddd, J=7.6, 1.4, 0.5 Hz, 1H), 7.73 (td, J=7.6, 1.4 Hz, 1H), 7.65 (td, J=7.5, 1.4 Hz, 1H), 7.41 (s, 1H), 7.29 (d, J=8.2 Hz, 1H), 7.06 (d, J=8.3 Hz, 1H), 3.91 (s, 2H), 2.69-2.32 (m, 2H), 1.55 (p, J=7.6 Hz, 2H), 1.36-1.20 (m, 10H), 0.85 (t, J=6.5 Hz, 2H); $^{13}$C NMR (CDCl$_3$, 100 MHz) δ 184.4 (C, C=O), 181.7 (C, C=O), 153.0 (C), 141.0 (C), 136.0 (CH), 134.9 (CH), 132.9 (C), 129.4 (C), 129.0 (2×CH), 128.5 (2×CH), 126.9 (CH), 126.1 (CH), 123.3 (C), 35.6 (CH$_2$), 31.9 (CH$_2$), 31.5 (CH$_2$), 29.5 (CH$_2$), 29.4 (CH$_2$), 29.2 (CH$_2$), 28.7 (CH$_2$), 22.7 (CH$_2$), 14.1 (CH$_3$).

Application and Treatments

The various compositions of the present invention, that is the different naphthoquinone derivatives of Lawsone, have been found to be very effective in treating various skin and wound infections as well as non-lethal systemic infections of small animals. That is, the above-noted antimicrobial compounds of the present invention when they are administered to a human being will reduce or inhibit the growth of *Staphylococcus aureus* such as MRSA. By the term "reduce or inhibit" it is meant that the growth of various CFU is reduced. That is, the reduction of such colonies is generally at least 90%, desirably at least about 99%, and preferably at least about 99.9% based upon the results from MIC test.

The administration of the one or more antimicrobial compounds of the present invention can be carried out in a variety of different treatments. For example, antimicrobial compound can be applied in dosages defined as mg/kg which in medical terms refers to milligrams of the antibiotic that is applied to a human being per the weight of the human being in kilograms. The antimicrobial compound can be orally applied as in the form of a pill, tablet, and the like wherein the weight amount of the antimicrobial compound is as set forth hereinbelow.

An application and often desired is the intravenous administration of an effective amount of the antimicrobial compounds of the present invention to a human being with infected wound, skin, soft tissue, bone, or endocarditis.

Another desired method of application is the topical application of the antimicrobial compound to parts of a human being such as an infected wound, skin, or soft tissue.

Another important aspect of the present invention is that in addition to, that is in combination with the one or more different antimicrobial compounds of the present invention that can be utilized to treat *Staphylococcus aureus* as well as MRSA, is the utilization of other known clinical antibiotic compounds such as one or more of oxacillin, ofloxacin, ciprofloxacin, vancomycin, or daptomycin. That is, only one, or two, or three of such compounds, or any combination thereof can be used in various amounts in combination with the antimicrobial compound of the present invention to treat infected skin areas or infected wounds, and the like.

Thus, numerous different dosages can be utilized to treat a human being with respect to treatment of a skin or soft tissue area, or an infected wound, and the like. Examples of suitable dosage for treating various infections are as follows. With respect to treating skin or soft tissue by a topical administration, a desired dosage amount is from about 0.3 mg/kg to about 300 mg/kg, desirably from about 3 mg/kg to about 30 mg/kg and preferably from about 5 mg/kg to about 15 mg/kg. With regard to treating infections of the skin or soft tissue via intravenous administration, a suitable dosage amount can range generally from about 0.3 mg/kg to about 300 mg/kg, desirably from about 3 mg/kg to about 30 mg/kg, and preferably from about 5 mg/kg to about 15 mg/kg.

With respect to treatment of the skin and soft tissue and the like, via topical application wherein a antimicrobial compound of the present invention is utilized with one or more clinical antibiotics, the total range of all such antibiotic compounds is from about 0.3 mg/kg to about 300 mg/kg, desirably from about 3 mg/kg to about 30 mg/kg and preferably from about 5 mg/kg to about 15 mg/kg. The amount of the one or more clinical antibiotic compounds such as oxacillin, etc., can range from about 1 wt. % to about 99 wt. % with the remainder being an antibiotic of the present invention. When such a blend is utilized, it has been found that synergistic results are obtained such that the dosage amount of the blend of clinical antibiotics and the antibiotics of the present invention is only 55% to 75%, e.g. approximately about 65% by weight of the dosage if only the antibiotic of the present invention was used. Such ratio generally suitable for the entire dosage range set forth above for topical, etc., application to skin, etc. With respect to treatment of skin and soft tissue via an intravenous feeding of a blend of an antimicrobial compound of the present invention with one or more clinical antibiotics, the amount generally is from about 0.3 mg/kg to about 300 mg/kg, desirably from about 3 mg/kg to about 30 mg/kg, and preferably from about 5 mg/kg to about 15 mg/kg.

With respect to treatment of infected wounds such as a diabetic wound, pressure ulcer, and venous leg ulcer, as well as internal organs comprising a lung, liver, kidney, spleen, or peritoneal tissue suitable dosage ranges are as follows: For treatment of an infected wound via a topical administration a general range is from about 0.3 mg/kg to about 300 mg/kg, a desired range is from about 3 mg/kg to about 30 mg/kg, and a preferred range is from about 5 mg/kg to about 15 mg/kg. With respect to an intravenous application of the antimicrobial compounds of the present invention to treat an infected wound, a general range is from about 0.3 mg/kg to about 300 mg/kg, a desired range is from about 3 mg/kg to about 30 mg/kg, and a preferred range is from about 5 mg/kg to about 15 mg/kg. As noted above, infected wounds can also be treated utilizing a combination of one or more antimicrobial compounds of the present invention with one or more clinical antibiotics. As noted above and hereby fully incorporated by reference, synergistic results are achieved and the noted amounts and ranges are also incorporated. Suitable topical dosages range generally from about 0.3 mg/kg to about 300 mg/kg, desirably from about 3 mg/kg to about 30 mg/kg, and preferably from about 5 mg/kg to about 15 mg/kg. When the treatment relates to a wound by an intravenous method with a clinical antibiotic, a general range is from about 0.3 mg/kg to about 300 mg/kg, desirably from about 3 mg/kg to about 30 mg/kg, and preferably from about 5 mg/kg to about 15 mg/kg. The ratio or weight percent of the antimicrobial compound in the blend of the one or more antimicrobial-clinical antibiotics is generally from about 1 wt. % to about 99 wt. %, desirably from about 55 wt. % to about 75 wt. %, and preferably from about 60 wt. % to about 70 wt. %.

While in accordance with the patent statutes, the best mode and preferred embodiment have been set forth, the scope of the invention is not limited thereto, but rather by the scope of the attached claims.

What is claimed is:

1. A method of treating an infected human being and/or animal comprising:
    topically administering a composition to said human being and/or animal,
    wherein the composition comprises;
    one or more compounds having the formula:

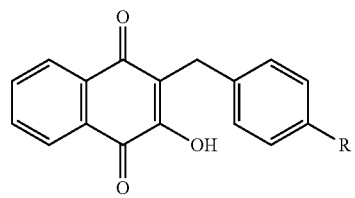

where R, independently, comprises $CH_2CH_3$, or $(CH_2)_3CH_3$, or $(CH_2)_5CH_3$, or $(CH_2)_7CH_3$, or any combination thereof, wherein the composition is capable of inhibiting or reducing the growth of methicillin-sensitive *Staphylococcus aureus* by at least 1-Log CFU.

2. A method of treating an infected human being and/or animal comprising:
    topically or intravenously administering a composition to said human being and/or animal,
    wherein the composition comprises:
    one or more compounds having the formula:

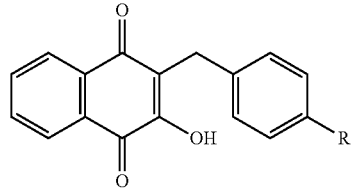

where R, independently, comprises $CH_2CH_3$, or $(CH_2)_3CH_3$, or $(CH_2)_5CH_3$, or $(CH_2)_7CH_3$, or any combination thereof, wherein the composition is capable of inhibiting or reducing the growth of methicillin-resistant *Staphylococcus aureus* by at least 1-Log CFU.

3. The method according to claim 2, further comprising the step of topically administering the composition to skin or soft tissue of said human being and/or animal at a dose of from about 0.3 mg/kg to about 300 mg/kg.

4. The method according to claim 2, further comprising the step of topically administering the composition to an infected wound of said human being and/or animal at a dose of from about 0.3 mg/kg to about 300 mg/kg.

5. The method according to claim 2, further comprising the step of intravenously administrating the composition to said human being and/or animal at a dose of from about 0.3 mg/kg to about 300 mg/kg.

6. The method according to claim 2, further comprising the step of topically administering to skin or soft tissue of said human being and/or animal the composition in combination with one or more of oxacillin, ofloxacin, ciprofloxacin, vancomycin, or daptomycin.

7. The method according to claim 2, further comprising the step of topically administering to an infected wound of said human being and/or animal the composition in combination with one or more of oxacillin, ofloxacin, ciprofloxacin, vancomycin, or daptomycin.

8. The method according to claim 2, further comprising the step of intravenously administering to skin or soft tissue of said human being and/or animal the composition in combination with one or more of oxacillin, ofloxacin, ciprofloxacin, vancomycin, or daptomycin.

* * * * *